US008863877B2

(12) United States Patent
Saeki

(10) Patent No.: US 8,863,877 B2
(45) Date of Patent: Oct. 21, 2014

(54) VEHICLE BATTERY MOUNTING STRUCTURE

(71) Applicant: Koji Saeki, Toyota (JP)

(72) Inventor: Koji Saeki, Toyota (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 0 days.

(21) Appl. No.: 13/683,193

(22) Filed: Nov. 21, 2012

(65) Prior Publication Data

US 2013/0126255 A1 May 23, 2013

(30) Foreign Application Priority Data

Nov. 22, 2011 (JP) ................. 2011-255320

(51) Int. Cl.
*B60R 16/04* (2006.01)
*B62D 21/15* (2006.01)
*H01M 2/10* (2006.01)
*B60K 1/04* (2006.01)

(52) U.S. Cl.
CPC . *B60K 1/04* (2013.01); *B60R 16/04* (2013.01); *B62D 21/152* (2013.01); *H01M 2/1083* (2013.01); *B60K 2001/0438* (2013.01); Y10S 248/909 (2013.01)
USPC .......... 180/68.5; 180/271; 180/274; 248/909; 403/2

(58) Field of Classification Search
CPC ............... B60K 1/04; B60K 2001/04; B60K 2001/0438; B60K 6/28; H01M 2/1083; B60R 16/04; B60L 11/1877; B62D 21/15; B62D 21/152; B62D 21/155
USPC ............ 180/68.5, 271, 274; 403/2; 248/909; 188/371, 376
See application file for complete search history.

(56) References Cited

U.S. PATENT DOCUMENTS

| 3,896,739 | A | * | 7/1975 | Crofts ........................ 105/133 |
| 4,621,822 | A | * | 11/1986 | Knochelmann et al. ...... 280/834 |
| 5,364,128 | A | * | 11/1994 | Ide ............................ 280/784 |
| 5,681,057 | A | * | 10/1997 | Whirley et al. ............. 280/784 |
| 7,066,531 | B2 | * | 6/2006 | Tomita .................... 296/187.03 |
| 7,401,669 | B2 | * | 7/2008 | Fujii et al. .................. 180/65.1 |

(Continued)

FOREIGN PATENT DOCUMENTS

| GB | 2329877 A | * | 4/1999 |
| JP | 10-147153 A | | 6/1998 |

(Continued)

*Primary Examiner* — J. Allen Shriver, II
*Assistant Examiner* — Steve Clemmons
(74) *Attorney, Agent, or Firm* — Oblon, Spivak, McClelland, Maier & Neustadt, L.L.P.

(57) ABSTRACT

A vehicle battery mounting structure includes a first frame member, a battery unit, a coupling portion, and a brittle portion. The first frame member supports a vehicle floor and includes a front portion, an inclined portion and a rear portion. The inclined portion extends rearward from a rear end of the front portion in a front-rear direction of the vehicle and upward from the rear end in a vertical direction of the vehicle. The battery unit is disposed under the vehicle floor. The coupling portion couples the battery unit to the inclined portion or a second frame member connected to the inclined portion. The brittle portion is provided at the coupling portion and releases the inclined portion or the second frame member from a connection with the battery unit when a forward load is applied to the coupling portion in the front-rear direction of the vehicle.

11 Claims, 4 Drawing Sheets

(56) References Cited

U.S. PATENT DOCUMENTS

| | | | |
|---|---|---|---|
| 7,610,978 B2 * | 11/2009 | Takasaki et al. | 180/68.5 |
| 7,717,207 B2 * | 5/2010 | Watanabe et al. | 180/68.5 |
| 7,921,951 B2 * | 4/2011 | Watanabe et al. | 180/68.5 |
| 8,037,960 B2 * | 10/2011 | Kiya | 180/68.5 |
| 8,051,934 B2 * | 11/2011 | Kiya et al. | 180/68.5 |
| 8,540,282 B2 * | 9/2013 | Yoda et al. | 280/784 |
| 2007/0215399 A1 * | 9/2007 | Watanabe et al. | 180/68.5 |
| 2008/0047767 A1 * | 2/2008 | Tsuchiya | 180/68.5 |
| 2008/0190679 A1 * | 8/2008 | Sato et al. | 180/68.5 |
| 2009/0145676 A1 * | 6/2009 | Takasaki et al. | 180/65.1 |
| 2009/0166116 A1 * | 7/2009 | Kiya et al. | 180/68.5 |
| 2009/0226806 A1 * | 9/2009 | Kiya | 429/186 |
| 2009/0242298 A1 * | 10/2009 | Guss et al. | 180/68.5 |
| 2009/0242299 A1 * | 10/2009 | Takasaki et al. | 180/68.5 |
| 2010/0032542 A1 * | 2/2010 | Heitkamp et al. | 248/548 |
| 2010/0101885 A1 * | 4/2010 | Nozaki et al. | 180/232 |
| 2012/0097466 A1 * | 4/2012 | Usami et al. | 180/68.5 |
| 2012/0111654 A1 * | 5/2012 | Origuchi | 180/68.5 |
| 2013/0008735 A1 * | 1/2013 | Hiramatsu et al. | 180/291 |

FOREIGN PATENT DOCUMENTS

| | | | |
|---|---|---|---|
| JP | 2001113959 A | * | 4/2001 |
| JP | 2004262413 A | * | 9/2004 |
| JP | 2009-87773 A | | 4/2009 |
| JP | 2011-121483 A | | 6/2011 |

* cited by examiner

VEHICLE BATTERY MOUNTING STRUCTURE

INCORPORATION BY REFERENCE

The disclosure of Japanese Patent Application No. 2011-255320 filed on Nov. 22, 2011 including the specification, drawings and abstract is incorporated herein by reference in its entirety.

BACKGROUND OF THE INVENTION

1. Field of the Invention

The present invention relates to a vehicle battery mounting structure.

2. Description of the Related Art

There is a known mounting structure for a vehicle battery unit in which a battery unit is installed under a floor panel (see, for example, Japanese Patent Application Publication No. 2011-121483 (JP 2011-121483 A)). According to the mounting structure for the vehicle battery unit disclosed in JP 2011-121483 A, a vehicle body is constituted of frame members including a main frame (front side members), rear side members, side sills and the like. According to JP 2011-121483 A, the battery unit is mounted to the lower sides of the frame members in a vertical direction of the vehicle body.

However, the mounting structure for a vehicle battery unit disclosed in JP 2011-121483 A involves the possibility that if the rear side member is deformed by a rear-end collision from an approaching vehicle (hereinafter, referred to as "rear-end collision"), the battery unit may be deformed following the deformation of the rear side member.

SUMMARY OF THE INVENTION

The invention provides a vehicle battery mounting structure which reduces the possibility that the battery unit is deformed following the deformation of the frame member in the rear-end collision.

According to an aspect of the invention, a vehicle battery mounting structure includes: a first frame member, a battery unit, a coupling portion and a brittle portion. The first frame member supports a vehicle floor and includes a front portion, an inclined portion and a rear portion. The front portion extends in a front-rear direction of a vehicle. The inclined portion extends rearward from a rear end of the front portion in the front-rear direction of the vehicle and upward from the rear end of the front portion in a vertical direction of the vehicle. The rear portion extends rearward from a rear end of the inclined portion in the front-rear direction of the vehicle. The battery unit is disposed under the vehicle floor in the vertical direction of the vehicle. The coupling portion couples, to the battery unit, the inclined portion or a second frame member connected to the inclined portion. The brittle portion is provided at the coupling portion and releases the inclined portion or the second frame member from a connection with the battery unit when a forward load in the front-rear direction of the vehicle is applied to the coupling portion.

In the vehicle battery mounting structure according to the one aspect of the invention, the forward load in the front-rear direction of the vehicle is applied to the brittle portion formed at the coupling portion at the time of rear-end collision. The load is applied to the brittle portion via the inclined portion of the first frame member or the second frame member connected to the inclined portion (hereinafter, abbreviated as "the inclined portion of the first frame member or the like" as needed). When the forward load in the front-rear direction of the vehicle is applied to the brittle portion, the inclined portion of the first frame member or the like is released from the connection with the battery unit. Therefore, the possibility that the battery unit is deformed following the deformation of the inclined portion of the first frame member or the like is reduced.

The inclined portion of the first frame member extends rearward from the rear end of the front portion of the first frame member in the front-rear direction of the vehicle and upward therefrom in the vertical direction of the vehicle. The rear portion of the first frame member extends rearward from the rear end of this inclined portion in the front-rear direction of the vehicle. When the forward load in the front-rear direction of the vehicle is applied to the rear portion of the first frame member, therefore, the inclined portion is deformed in a manner that the rear end of the inclined portion is raised upward relative to a front end thereof in the vertical direction of the vehicle. Namely, the inclined portion is rotationally deformed. This further facilitates the release of the inclined portion of the first frame member or the like from the connection with the battery unit. Therefore, the possibility that the battery unit is deformed following the deformation of the inclined portion of the first frame member or the like is more assuredly reduced.

In the vehicle battery mounting structure according to the aspect of the invention described above, the brittle portion may release the inclined portion or the second frame member from the connection with the battery unit when a forward load of more than a predetermined value is applied to the brittle portion in the front-rear direction of the vehicle.

In the vehicle battery mounting structure according to the aspect of the invention described above, a rear portion of the battery unit in the front-rear direction of the vehicle may be disposed under the inclined portion in the vertical direction of the vehicle, as seen in a width direction of the vehicle. In addition, the coupling portion may be a battery bracket and disposed at the rear portion of the battery unit.

According to the above construction, the rear portion of the battery unit in the front-rear direction of the vehicle is disposed under the inclined portion of the first frame member in the vertical direction of the vehicle, as seen in the width direction of the vehicle. The rear portion of this battery unit and the inclined portion of the first frame member or the like are coupled together by means of the battery bracket. Hence, the battery unit can be increased in size (the battery can be increased in capacity) and besides, the possibility that the battery unit is deformed following the deformation of the inclined portion of the first frame member or the like is reduced.

In the vehicle battery mounting structure according to the aspect of the invention described above, the battery bracket may include a vehicle body side fixing portion that a through-hole is formed in. Further, the through-hole may be penetrated by a connecting member. The connecting member interconnects the battery bracket and the inclined portion or the second frame member in the vertical direction of the vehicle. In addition, the brittle portion may be formed at a front edge portion constituting a front portion of the through-hole in the front-rear direction of the vehicle.

According to the above construction, when the rear-end collision applies the forward load to the rear portion of the first frame member in the front-rear direction of the vehicle, the connecting member is displaced forward in the front-rear direction of the vehicle relative to the vehicle body side fixing portion. It is noted here that the connecting member is inserted through the through-hole formed in the vehicle body side fixing portion of the battery bracket. Thus, the brittle portion formed at the front edge portion of the through-hole is pressed forward by the connecting member in the front-rear direction of the vehicle. That is, the forward load is applied to the brittle portion in the front-rear direction of the vehicle. Then, the forward load induces fracture or the like of the vehicle body side fixing portion, which fracture starts from the brittle portion. When the connecting member is thus allowed to drop out of the through-hole, the inclined portion of the first frame member or the like and the vehicle body side fixing portion are released from the connection. Accordingly, the possibility that the battery unit is deformed following the deformation of the inclined portion of the first frame member or the like is reduced.

In the vehicle battery mounting structure according to the aspect of the invention described above, the battery bracket may include a battery-side fixing portion connected to the battery unit. The battery-side fixing portion may be provided with a reinforcing portion that increases connection strength between the battery-side fixing portion and the battery unit to a higher level than that of connection strength between the vehicle body side fixing portion and the inclined portion or the second frame member.

According to the above construction, the reinforcing portion provided at the battery-side fixing portion increases the connection strength between the battery-side fixing portion and the battery unit to a higher level than that of the connection strength between the vehicle body side fixing portion and the inclined portion of the first frame member or the like.

It is noted here that if the rear-end collision releases the battery unit from the connection with the battery-side fixing portion prior to releasing the inclined portion of the first frame member or the like from the connection with the vehicle body side fixing portion, the battery bracket may be deformed following the deformation of the inclined portion of the first frame member or the like, thus colliding with the battery unit.

According to the aspect of the invention, on the other hand, the reinforcing portion provided at the battery-side fixing portion increases the connection strength between the battery-side fixing portion and the battery unit to the higher level than that of the connection strength between the vehicle body side fixing portion and the inclined portion of the first frame member or the like. At the time of rear-end collision, therefore, the inclined portion of the first frame member or the like is released from the connection with the vehicle body side fixing portion before the battery unit is released from the connection with the battery-side fixing portion. Accordingly, the possibility that the battery bracket collides with the battery unit is reduced.

In the vehicle battery mounting structure according to the aspect of the invention described above, the battery bracket may include a side wall that extends from the battery-side fixing portion toward the vehicle body side fixing portion. Here, the vehicle body side fixing portion is disposed upwardly of the battery-side fixing portion in the vertical direction of the vehicle. Further, the reinforcing portion may extend between the battery-side fixing portion and the side wall.

According to the above construction, the reinforcing portion is so provided as to extend between the battery-side fixing portion and the side wall and hence, the battery-side fixing portion and the side wall are connected together by the reinforcing portion. Hence, the connection strength between the battery-side fixing portion and the battery unit can be increased effectively.

In the vehicle battery mounting structure according to the aspect of the invention described above, the battery unit may include a battery module for storing electric power and a battery rear frame extending in the width direction of the vehicle. Further, as seen in the vertical direction of the vehicle, the position of the battery rear frame in the front-rear direction of the vehicle may be rearward of the position of the battery module in the front-rear direction of the vehicle. In addition, the battery bracket may be provided at the battery rear frame.

According to the above construction, the battery rear frame is positioned rearward of the battery module in the front-rear direction of the vehicle, as seen in the vertical direction of the vehicle. This ensures that an impacting object approaching the battery module from the rear side thereof in the front-rear direction of the vehicle collides with the battery rear frame prior to colliding with the battery module. Thus, the possibility that the battery module is broken or the like is reduced.

In the vehicle battery mounting structure according to the aspect of the invention described above, the first frame member may be a pair of rear side members extending along both end portions of the vehicle floor with respect to the width direction of the vehicle. Further, the second frame member may be a cross member and extend in the width direction of the vehicle. Here, the cross member interconnects the inclined portions of the pair of rear side members. In addition, the battery bracket may interconnect the battery unit and the cross member.

According to the above construction, the cross member interconnects the inclined portions of the pair of rear side members while the battery unit is coupled to the cross member by means of the battery bracket. This construction makes it easy to assemble a rear suspension and the like to the inclined portion of the rear side member, for example, in comparison with a construction in which the battery unit is coupled to the inclined portion of the rear side member by means of the battery bracket.

As described above, the vehicle battery mounting structure according to the embodiment of the invention reduces the possibility that the battery unit is deformed following the deformation of the frame member caused by the rear-end collision.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
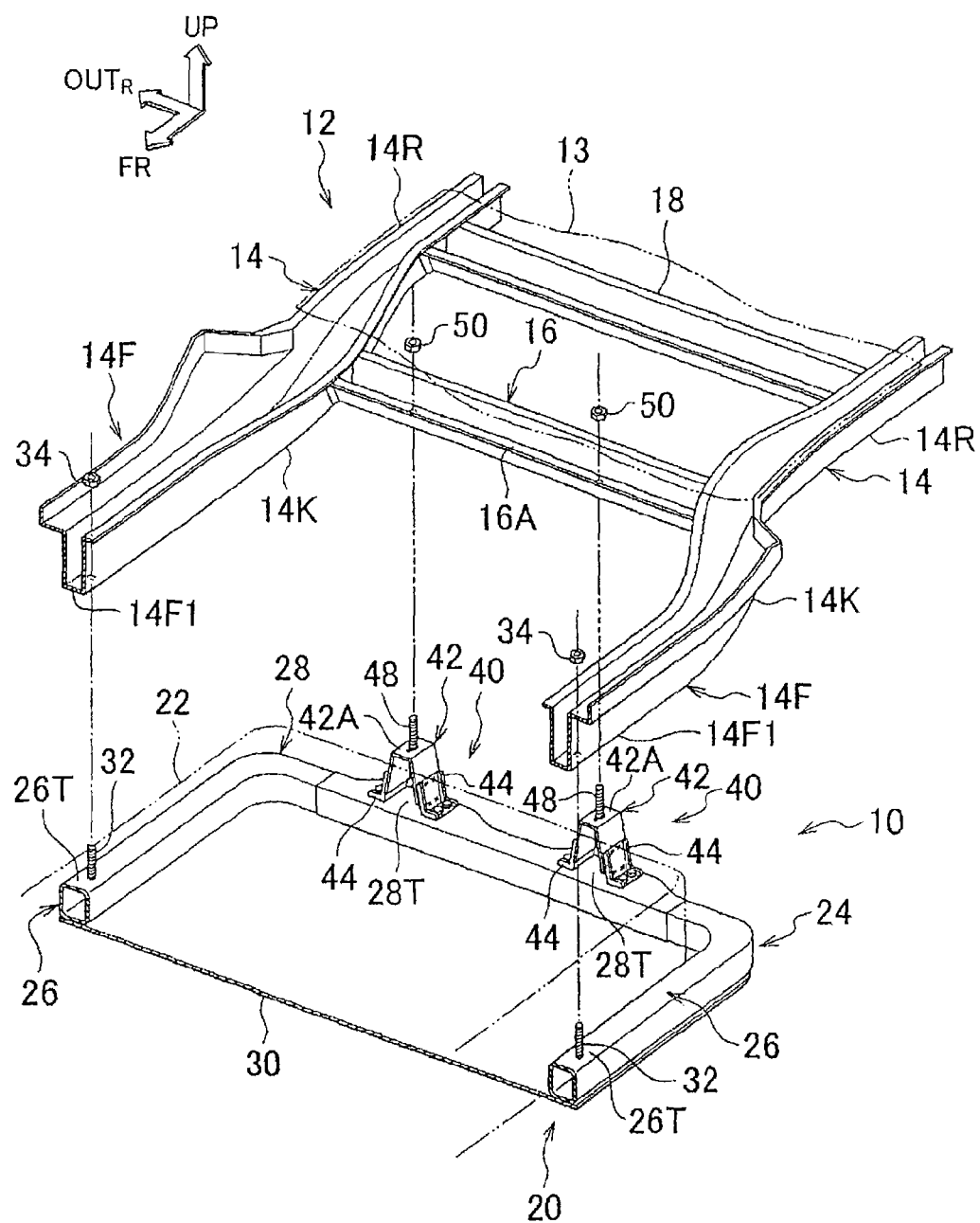
FIG. 1 is an exploded perspective view showing a rear body structure of a vehicle to which an vehicle battery mounting structure according to one embodiment of the invention is applied.

A vehicle battery mounting structure according to one embodiment of the invention is described as below with reference to the accompanying drawings. In the drawings, an arrow FR denotes a front side of a vehicle in a front-rear direction thereof, an arrow UP denotes an upper side of the vehicle in a vertical direction thereof, and an arrow $OUT_R$ denotes an outside on the right side of the vehicle in a width direction thereof.

FIG. 1 is an exploded perspective view showing a rear body structure 12 of a vehicle to which a vehicle battery mounting structure 10 according to an embodiment of the invention is applied. This vehicle may be, for example, an electric vehicle powered by an electric motor not shown, a gas hybrid vehicle, a fuel cell hybrid vehicle or the like. This vehicle includes a battery unit 20 which is disposed under a floor panel 13 in the vertical direction of the vehicle. The floor panel 13 constitutes a vehicle floor. The battery unit 20 stores electric power supplied to the electric motor. In FIG. 1, a part of the floor panel 13 is depicted with a chain double-dashed line.

The rear body structure 12 of the vehicle includes a pair of rear side members 14, a center cross member 16 and a rear cross member 18. The pair of rear side members 14 serves as a first frame member. The center cross member 16 serves as a second frame member (cross member). The paired rear side members 14 are spaced from each other in the width direction of the vehicle to define a space therebetween. A longitudinal direction of the pair of rear side members 14 is equivalent to the front-rear direction of the vehicle. Further, the pair of rear side members 14 constitutes a frame of a lateral lower part of the vehicle body. These rear side members 14 have a hat-shaped cross section open at an upper side thereof in the vertical direction of the vehicle.

The rear side members 14 each have a front portion 14F and a rear portion 14R in the front-rear direction of the vehicle. The rear portion 14R is located upward in the vertical direction of the vehicle and inward in the width direction of the vehicle relative to the front portion 14F. These front portion 14F and rear portion 14R are interconnected by means of a kick-up portion 14K. The kick-up portion 14K serves as an inclined portion. As seen from the outside in the width direction of the vehicle, the kick-up portion 14K extends from a rear end of the front portion 14F to a front end of the rear portion 14R, extending rearward in the front-rear direction of the vehicle and upward in the vertical direction of the vehicle. That is, as seen from the outside in the width direction of the vehicle, the kick-up portion 14K is inclined in a manner that the kick-up portion 14K is progressively raised upward in the vertical direction of the vehicle as the kick-up portion 14K extends from the front portion 14F to the rear portion 14R. The floor panel 13 is bridged between the rear side members 14 thus constructed. That is, the paired rear side members 14 extend along both end portions of the floor panel 13 with respect to the width direction of the vehicle, thus bearing the floor panel 13 relative to an unillustrated rear suspension and the like.

The kick-up portions 14K of the rear side members 14 are interconnected by means of the center cross member 16. The center cross member 16 constitutes a frame of a lower part of the vehicle body and has a hat-shaped cross section open at an upper side thereof in the vertical direction of the vehicle. It is noted here that the center cross member 16 is disposed between the kick-up portions 14K of the pair of rear side members 14. Accordingly, the longitudinal direction of the center cross member 16 is equivalent to the width direction of the vehicle. The longitudinal both end portions of the center cross member 16 are connected to the respective kick-up portions 14K by welding or the like.

The rear cross member 18 constituting the frame of the lower part of the vehicle body is disposed rearward of the center cross member 16 in the front-rear direction of the vehicle. Similarly to the center cross member 16, the rear cross member 18 is so formed as to have a hat-shaped cross section open at an upper side thereof in the vertical direction of the vehicle and is disposed between the rear portions 14R of the pair of rear side members 14. The longitudinal direction of the rear cross member 18 is equivalent to the width direction of the vehicle. The longitudinal both end portions of the rear cross member 18 are connected to the respective rear portions 14R by welding or the like.

The battery unit 20 is mounted to the rear side members 14 and the center cross member 16 of such constructions at lower sides thereof in the vertical direction of the vehicle. The battery unit 20 includes a battery module 22, and a battery frame 24 supporting the battery module 22. The battery module 22 is a battery for storing electric power supplied to the above-described electric motor (not shown). An upper part of the battery module 22 is disposed between the front portions 14F of the pair of rear side members 14. In FIG. 1, an outline of the battery module 22 is depicted with a chain double-dashed line.

The battery frame 24 includes a pair of battery side frames 26, a pair of battery front frames (not shown) and a battery rear frame 28. The paired battery side frames 26 are disposed on the both sides of the battery module 22 in the width direction of the vehicle and extend in the front-rear direction of the vehicle. The pair of battery front frames and the battery rear frame 28 are disposed on the both sides of the battery module 22 with respect to the front-rear direction of the vehicle and extend in the width direction of the vehicle. In this manner, the battery frame 24 as a whole is formed in a frame-like configuration. Further, a battery lower cover 30 is fixed to the battery frame 24 by welding or the like. The battery lower cover 30 covers the lower side of the battery module 22 in the vertical direction of the vehicle.

The battery side frame 26 is formed of a tubular steel member having a substantially rectangular cross section. A top wall of the battery side frame 26 serves as a side frame mounting portion 26T. The battery side frame 26 has the side frame mounting portion 26T assembled to a lower side of the front portion 14F of the rear side member 14 in the vertical direction of the vehicle. Specifically, the side frame mounting portion 26T is provided with a bolt 32 projecting upward from the side frame mounting portion 26T in the vertical direction of the vehicle. The side frame mounting portion 26T is connected to a bottom wall 14F1 of the front portion 14F of the rear side member 14 by means of this bolt 32 and a nut 34.

Rear end portions of the battery side frames 26 in the front-rear direction of the vehicle are interconnected by the battery rear frame 28 in the width direction of the vehicle. The battery rear frame 28 is formed of a tubular steel member having a substantially rectangular cross section. As seen from the above in the vertical direction of the vehicle, the position of the battery rear frame 28 in the front-rear direction of the vehicle is rearward of the position of the battery module 22 in the front-rear direction of the vehicle. Longitudinally intermediate portions of this battery rear frame 28 serve as a pair of rear frame mounting portions 28T. The paired rear frame mounting portions 28T are each provided with a battery bracket 40 as a coupling portion. The battery rear frame 28 is assembled to a lower side of the center cross member 16 in the vertical direction of the vehicle by means of these battery brackets 40.

Figure 2A:
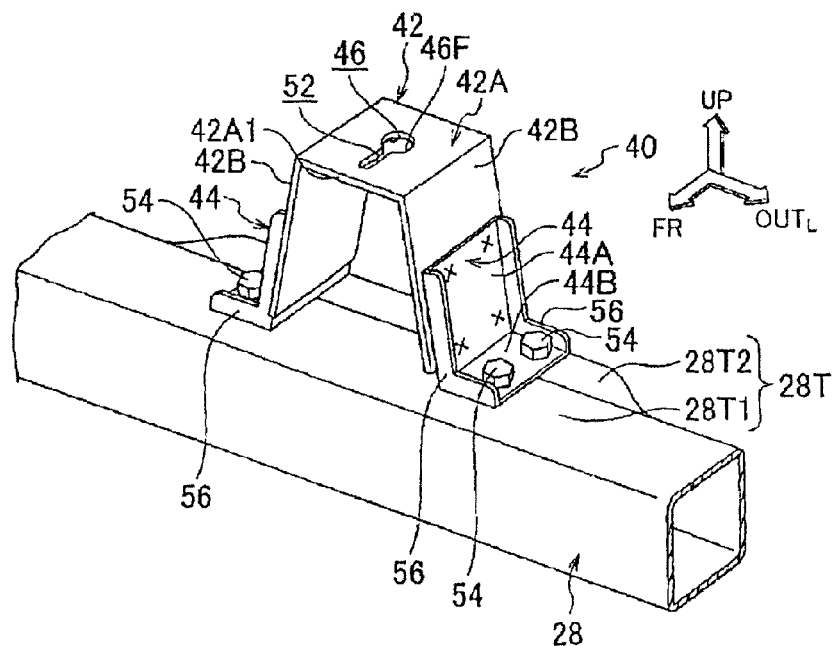
FIG. 2A is an enlarged perspective view showing a battery bracket shown in FIG. 1.
Figure 2B:
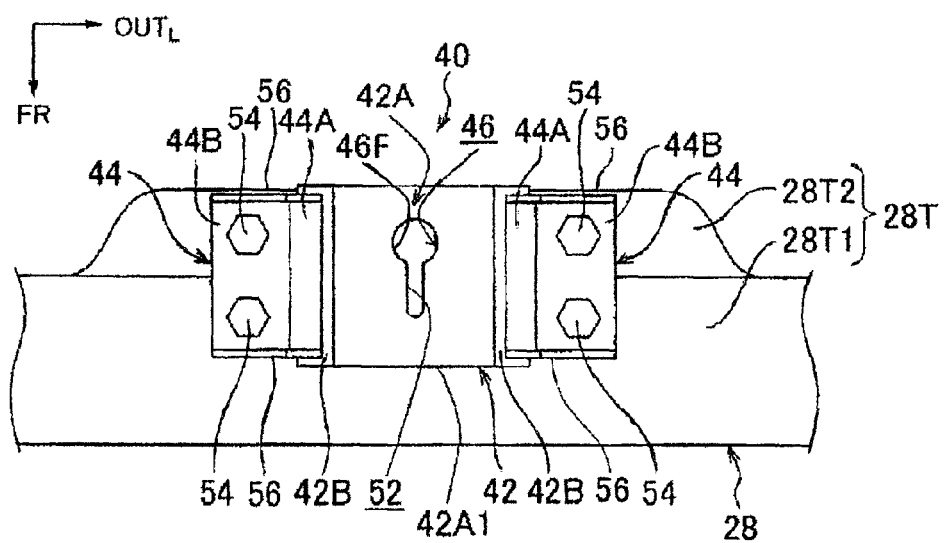
FIG. 2B is a plan view showing the battery bracket shown in FIG. 1.

As shown in FIG. 2A and FIG. 2B, the battery bracket 40 includes a battery bracket body 42 and a pair of bracket bases 44. In FIG. 2A, an arrow $OUT_L$ denotes the outside on the left side of the vehicle body in the width direction of the vehicle. The battery bracket body 42 is formed in substantially a C-shape in cross section open at a lower side thereof in the vertical direction of the vehicle. The battery bracket body 42 includes a vehicle body side fixing portion 42A and a pair of legs 42B. The vehicle body side fixing portion 42A constitutes an upper wall of the battery bracket body 42. The paired legs 42B extend downward from both end portions (with respect to the width direction of the vehicle) of the vehicle body side fixing portion 42A in the vertical direction of the vehicle. Theses legs 42B are opposed to each other in the width direction of the vehicle and inclined in a manner to be progressively spaced from each other as approaching the lower side in the vertical direction of the vehicle.

A through-hole 46 is formed in the vehicle body side fixing portion 42A and penetrates in a through-thickness direction of the vehicle body side fixing portion 42A. As shown in FIG. 1, a bolt 48 that serves as a connecting member penetrates this through-hole 46 from a lower side of the vehicle body side fixing portion 42A. The vehicle body side fixing portion 42A is connected to a lower wall 16A of the center cross member 16 by means of the bolt 48 and a nut 50.

As shown in FIG. 2B, a front edge portion 46F constituting a front portion of the through-hole 46 in the front-rear direction of the vehicle is formed with a groove 52 as a brittle portion. This groove 52 is shaped like a letter-U. The groove 52 extends from the front edge portion 46F toward a front end 42A1 of the vehicle body side fixing portion 42A in the front-rear direction of the vehicle. This groove 52 makes a portion of the vehicle body side fixing portion 42A between the front end 42A1 of the vehicle body side fixing portion 42A and the front edge portion 46F more brittle (less rigid) than the other portion of the vehicle body side fixing portion 42A. Because of this groove 52, fracture of the vehicle body side fixing portion 42A starts from the groove 52 when a forward load of more than a predetermined value is applied to the front edge portion 46F by the bolt 48 (see FIG. 1) in the front-rear direction of the vehicle. Otherwise, the through-hole 46 is diametrically expanded in conjunction with the expansion of the groove 52 so that a head (not shown) of the bolt 48 engaged with the lower side of the vehicle body side fixing portion 42A is allowed to drop out of the through-hole 46. It is noted here that the value of the above-described load causing the fracture of the vehicle body side fixing portion 42A or the diametrical expansion of the through-hole 46, namely the predetermined value of the above load varies according to the length of the groove 52 in the front-rear direction of the vehicle, the width of the groove 52 in the width direction of the vehicle, or the like.

The battery bracket body 42 is provided with the pair of bracket bases 44 on the both sides with respect to the width direction of the vehicle. The bracket base 44 is bent into substantially an L-shape in cross section, abutting on the leg 42B of the battery bracket body 42 and the rear frame mounting portion 28T. The bracket base 44 includes a slant wall 44A and a battery-side fixing portion 44B. The slant wall 44A is welded to the leg 42B of the battery bracket body 42. The battery-side fixing portion 44B extends from a lower end portion of the slant wall 44A to the opposite side from the battery bracket body 42. In this embodiment, the leg 42B of the battery bracket body 42 and the slant wall 44A of the bracket base 44 constitute a side wall of the battery bracket body 40 which extends from the battery-side fixing portion 44B toward the vehicle body side fixing portion 42A.

The battery-side fixing portion 44B overlaps with the rear frame mounting portion 28T. The battery-side fixing portion 44B is connected to the rear frame mounting portion 28T by means of two bolts 54 and two nuts (not shown) arranged in the front-rear direction of the vehicle. The rear frame mounting portion 28T includes a forward mounting portion 28T1 and a rearward mounting portion 28T2. The forward mounting portion 28T1 constitutes an upper wall of the battery rear frame 28. The rearward mounting portion 28T2 extends rearward from the forward mounting portion 28T1 in the front-rear direction of the vehicle. The battery-side fixing portion 44B is connected to the forward mounting portion 28T1 and the rearward mounting portion 28T2 by means of the bolts 54 and nuts.

The slant wall 44A and the battery-side fixing portion 44B of each bracket base 44 are reinforced with a pair of base reinforcements (reinforcing ribs) 56 as a reinforcing portion. The base reinforcements 56 extend along the both end portions of the slant wall 44A and the battery-side fixing portion 44B with respect to the front-rear direction of the vehicle. The pair of base reinforcements 56 extends between the slant wall 44A and battery-side fixing portion 44B. Specifically, the slant wall 44A and the battery-side fixing portion 44B are connected together by these base reinforcements 56. Thus, connection strength between the battery-side fixing portion 44B of the bracket base 44 and the rear frame mounting portion 28T is made higher than connection strength between the vehicle body side fixing portion 42A of the battery bracket body 42 and the lower wall 16A (see FIG. 1) of the center cross member 16.

Next, description is made on the function of the vehicle battery mounting structure according to the embodiment.

Figure 3:
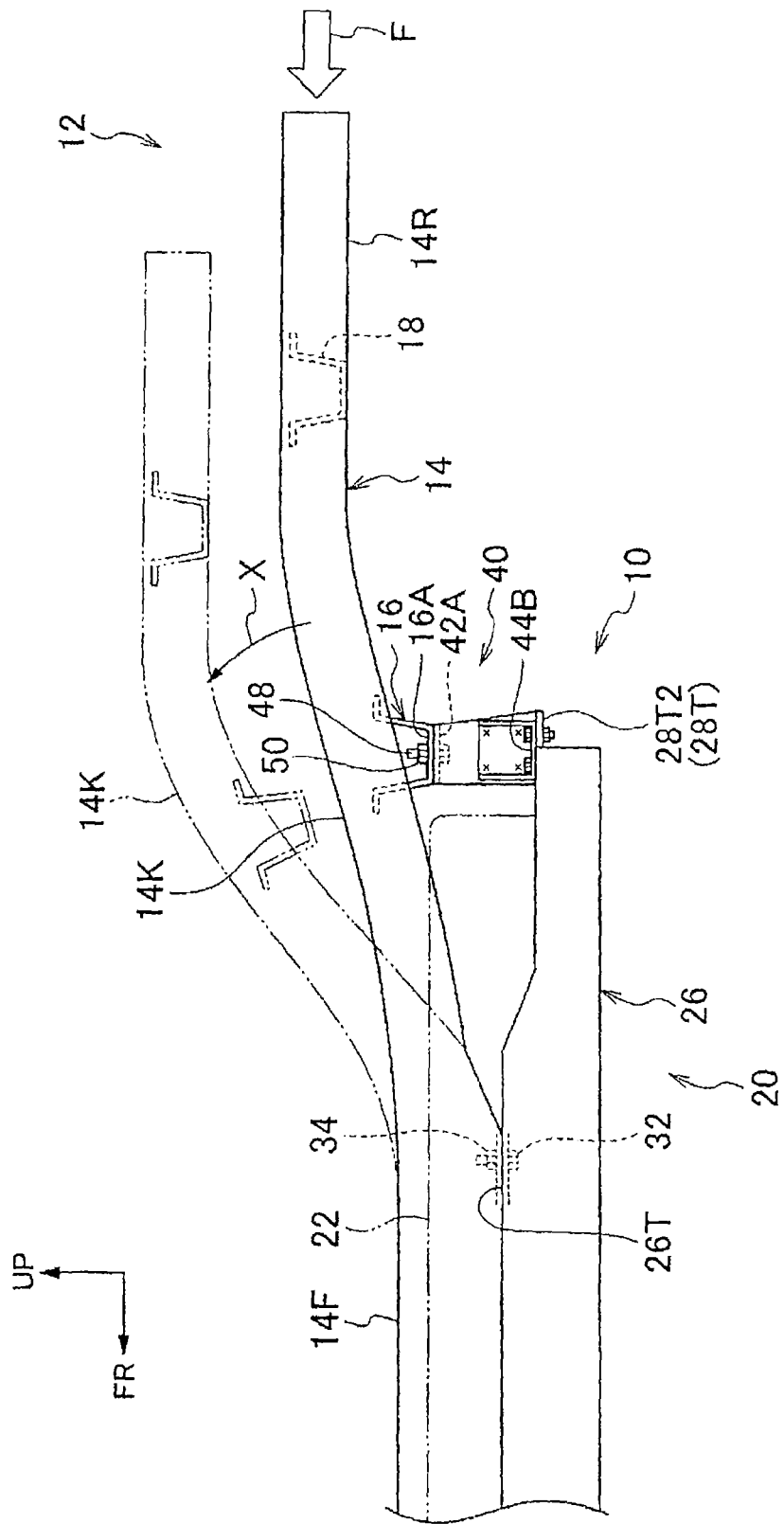
FIG. 3 is a schematic diagram showing the rear body structure of the vehicle shown in FIG. 1, as seen from an outside (left side) of the vehicle in a width direction thereof.

FIG. 3 is a side view schematically showing the rear body structure 12 of the vehicle according to the embodiment as seen from the outside (the left side of the vehicle body) in the width direction of the vehicle. When a rear-end collision applies a forward load F to the rear portion 14R of the rear side member 14 in the front-rear direction of the vehicle, as shown in FIG. 3, the center cross member 16 connected to the kick-up portion 14K of the rear side member 14 is displaced forwardly in the front-rear direction of the vehicle. Thus, the bolt 48 interconnecting the lower wall 16A of the center cross member 16 and the vehicle body side fixing portion 42A of the battery bracket 40 is displaced forwardly relative to the vehicle body side fixing portion 42A in the front-rear direction of the vehicle. Then, the bolt 48 presses forward the front edge portion 46F (see FIG. 2B) of the through-hole 46 formed in the vehicle body side fixing portion 42A in the front-rear direction of the vehicle.

It is noted here that the front edge portion 46F of the through-hole 46 formed in the vehicle body side fixing portion 42A is formed with the groove 52, as shown in FIG. 2B. This groove 52 makes the portion of the vehicle body side fixing portion 42A between the front end 42A1 of the vehicle body side fixing portion 42A and the front edge portion 46F of the through-hole 46 more brittle than the other portion of the vehicle body side fixing portion 42A.

Therefore, when the rear-end collision causes the bolt 48 to apply the forward load of more than the predetermined value to the groove 52 in the front-rear direction of the vehicle, the vehicle body side fixing portion 42A is fractured from the groove 52, i.e., the vehicle body side fixing portion 42A is broken from the groove 52. Otherwise, the groove 52 is expanded to diametrically expand the through-hole 46. When this allows the head (not shown) of the bolt 48 to drop out of the through-hole 46, the connection between the lower wall 16A of the center cross member 16 and the vehicle body side fixing portion 42A of the battery bracket 40 is released. Thus, the possibility that the battery rear frame 28 is displaced following the forward displacement of the center cross member 16 in the front-rear direction of the vehicle is reduced.

Further, the center cross member 16 interconnects the kick-up portions 14K of the pair of rear side members 14 in the width direction of the vehicle, as shown in FIG. 3. As seen from the outside in the width direction of the vehicle, the kick-up portion 14K extends rearward from the rear end of the front portion 14F of the rear side member 14 in the front-rear direction of the vehicle and upward from the rear end of the front portion 14F of the rear side member 14 in the vertical direction of the vehicle. When the rear-end collision applies the forward load F to the rear portion 14R of the rear side member 14 in the front-rear direction of the vehicle, therefore, a rear end of the kick-up portion 14K is lifted upward in the vertical direction of the vehicle relative to a front end of the kick-up portion 14K, as indicated by an arrow X in the figure. Namely, the kick-up portion 14K is rotationally deformed. In conjunction with the rotational deformation of the kick-up portion 14K, the center cross member 16 connected to this kick-up portion 14K is also rotationally deformed in the direction of the arrow X.

Due to the rotational deformation of the center cross member 16, the bolt 48 applies a load to the front edge portion 46F of the through-hole 46 in the direction of the arrow X. Specifically, the bolt 48 is subjected to the load working in a direction to extract the bolt 48 from the through-hole 46 forwardly in the front-rear direction of the vehicle and upwardly in the vertical direction of the vehicle. Therefore, the connection between the lower wall 16A of the center cross member 16 and the vehicle body side fixing portion 42A of the battery bracket 40 is more easily released in comparison with a construction, for example, in which the battery bracket 40 is connected to the front portion 14F of the rear side member 14.

Figure 4:
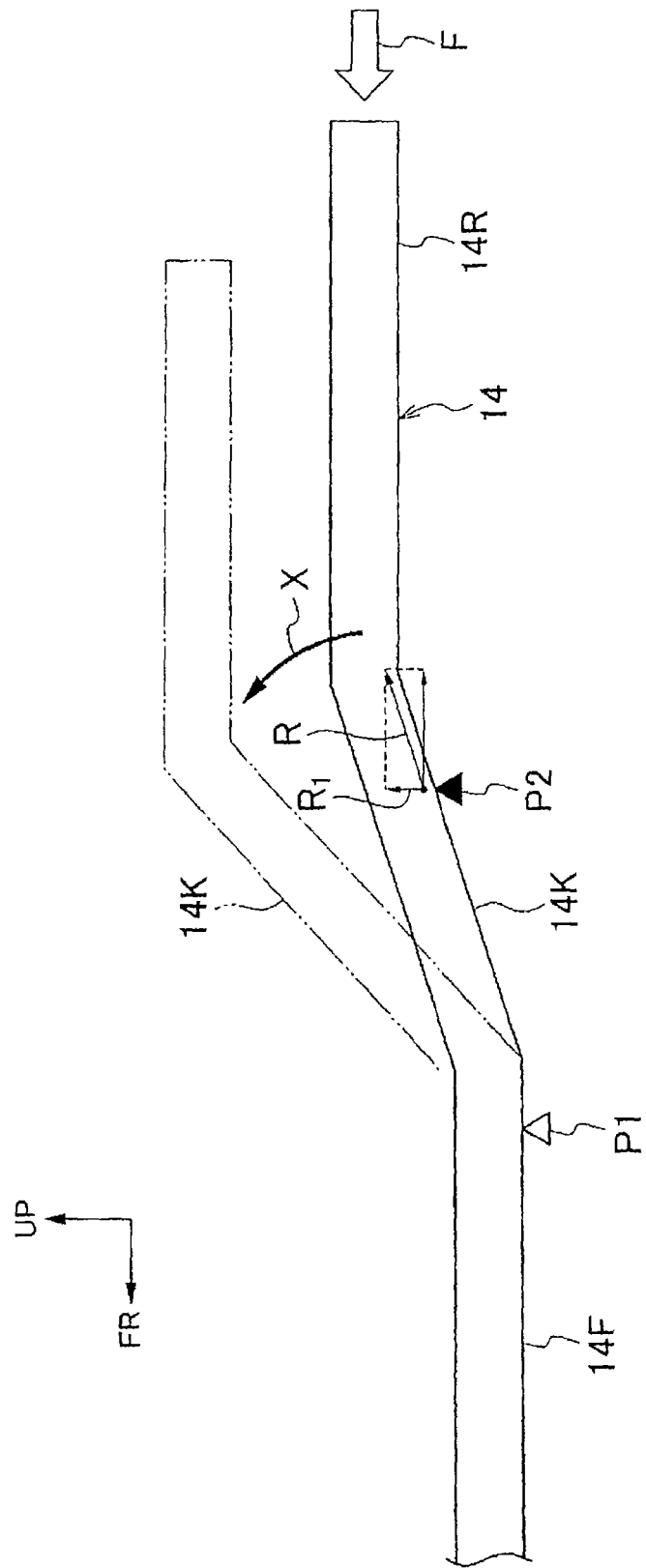
FIG. 4 is an explanatory diagram of a dynamic model of a rear side member shown in FIG. 3.

Further, FIG. 4 diagrammatically shows a dynamic model of the rear side member 14. A blank triangle shown in FIG. 4 denotes a connecting portion (support point P1) between the front portion 14F of the rear side member 14 and the battery side frame 26. A solid triangle denotes a connecting portion (support point P2) between the center cross member 16 (see FIG. 3) and the battery rear frame 28.

When the forward load F is applied to the rear portion 14R of the rear side member 14 in the front-rear direction of the vehicle, as shown in FIG. 4, a reaction force R occurs at the support point P2 and is directed toward the rear portion 14R along the direction of inclination of the kick-up portion 14K. A vertical component R1 of this reaction force R acts upward on the center cross member 16 (see FIG. 3) in the vertical direction of the vehicle. Thus, the above-described rotational deformation of the center cross member 16 (in the direction of the arrow X) is promoted.

According to the vehicle battery mounting structure 10 of this embodiment, the connection between the lower wall 16A of the center cross member 16 and the vehicle body side fixing portion 42A of the battery bracket 40 is released when the rear-end collision causes the bolt 48 to apply the forward load of more than the predetermined value to the groove 52 in the front-rear direction of the vehicle. Hence, in the rear-end collision, the possibility that the battery rear frame 28 is displaced following the forward displacement of the center cross member 16 in the front-rear direction of the vehicle is reduced. Thus, the possibility that the battery unit 20 is broken or the like is reduced.

According to the embodiment, the battery-side fixing portion 44B of the battery bracket 40 is reinforced with the pair of base reinforcements 56, as shown in FIG. 2A. Therefore, connection strength between the battery-side fixing portion 44B and the rear frame mounting portion 28T is made higher than connection strength between the vehicle body side fixing portion 42A of the battery bracket 40 and the lower wall 16A (see FIG. 1) of the center cross member 16.

It is noted here that if the connection between the battery-side fixing portion 44B of the battery bracket 40 and the rear frame mounting portion 28T is released prior to the releasing of the connection between the vehicle body side fixing portion 42A of the battery bracket 40 and the lower wall 16A of the center cross member 16, the battery bracket 40 displaced following the displacement of the center cross member 16 may collide with the battery module 22.

According to the embodiment, the battery-side fixing portion 44B of the battery bracket 40 is reinforced with the base reinforcements 56, as described above. Therefore, connection strength between the battery-side fixing portion 44B and the rear frame mounting portion 28T is made higher than connection strength between the vehicle body side fixing portion 42A of the battery bracket 40 and the lower wall 16A (see FIG. 1) of the center cross member 16. This facilitates the releasing of the connection between the vehicle body side fixing portion 42A of the battery bracket 40 and the lower wall 16A of the center cross member 16 before the connection between the battery-side fixing portion 44B of the battery bracket 40 and the rear frame mounting portion 28T is released. Thus, the possibility that the battery bracket 40 collides with the battery module 22 is reduced.

Each of the base reinforcements 56 extends between the slant wall 44A and battery-side fixing portion 44B. It is noted here that when the kick-up portion 14K of the rear side member 14 is rotationally deformed in the direction of the arrow X, a tensile load is applied to the legs 42B and the slant walls 44A of the battery bracket 40 in the vertical direction of the vehicle. When this tensile load lifts up a boundary portion between the slant wall 44A and the battery-side fixing portion 44B from the rear frame mounting portion 28T, the connection between the battery-side fixing portion 44B and the rear frame mounting portion 28T is easily released. According to the embodiment, however, a pair of base reinforcements 56 extends between the slant wall 44A and battery-side fixing portion 44B, as described above. That is, the slant wall 44A and battery-side fixing portion 44B are connected together by means of the pair of base reinforcements 56. This reduces the possibility that the boundary portion between the slant wall 44A and the battery-side fixing portion 44B is lifted. Therefore, the connection strength between the battery-side fixing portion 44B and the battery unit can be effectively increased.

According to the embodiment, the battery rear frame 28 constitutes a rear portion of the battery unit 20 in the front-rear direction of the vehicle, as shown in FIG. 3. As seen from the outside in the width direction of the vehicle, the battery rear frame 28 is disposed under the kick-up portion 14 of the rear side member 14 in the vertical direction of the vehicle. Therefore, the battery unit 20 can be increased in size (the battery can be increased in capacity).

As seen from the above in the vertical direction of the vehicle, the battery rear frame 28 is positioned rearward of the battery module 22 in the front-rear direction of the vehicle. Hence, an object to impact on the rear side of the battery module 22 in the front-rear direction of the vehicle collides with the battery rear frame 28 prior to colliding with the battery module 22. Therefore, the possibility that the battery module 22 is broken or the like is reduced. Since the battery bracket 40 is disposed on the rear frame mounting portion 28T of the battery rear frame 28, the battery bracket 40 covers the battery module 22 on the rear side in the front-rear direction of the vehicle. Hence, the possibility that the above-described impacting object collides with the battery module 22 is more assuredly reduced.

According to the embodiment, the center cross member 16 interconnects the kick-up portions 14K of the pair of rear side members 14. The center cross member 16 has longitudinally intermediate portions connected with the battery brackets 40. In comparison with a construction in which the battery bracket 40 is connected to the neighborhood of the kick-up portion 14K of the rear side member 14, it is easier to assemble the rear suspension and the like to the neighborhood of the kick-up portion 14K of the rear side member 14.

Next, description is made on exemplary modifications of the vehicle battery mounting structure according to the above-described embodiment.

According to the above embodiment, the groove 52 as the brittle portion is formed at the front edge portion 46F of the through-hole 46 formed in the vehicle body side fixing portion 42A of the battery bracket body 42. In place of this groove 52, a slit or notch as the brittle portion may be formed at the front edge portion 46F. Alternatively, the grooves or the like as the brittle portion may be formed at upper portions of the pair of legs 42B of the bracket body 42 such that the grooves or the like may induce the fracture of these legs 42B when the forward load of more than the predetermined value is applied to the bracket body 42 in the front-rear direction of the vehicle. Thus, the vehicle body side fixing portion 42A is separated from the legs 42B. The brittle portion according to the above embodiment may be a portion which is defined by partially cutting away the battery bracket 40. The above load of more than the predetermined value varies according to the configuration of the brittle portion.

According to the above embodiment, the battery rear frame 28 of the battery unit 20 and the center cross member 16 are interconnected by means of the battery bracket 40. Alternatively, the battery rear frame 28 of the battery unit 20 and the kick-up portions 14K of the rear side members 14 may be interconnected by means of the battery brackets 40. Further, the vehicle battery mounting structure 10 according to the above embodiment is also applicable to the other frame members than the rear side member 14.

The battery bracket 40 may be mounted not only to the battery rear frame 28 but also to other members. For example, the battery bracket 40 may also be mounted to a rear end of the battery side frame 26 in the front-rear direction of the vehicle, or other members constituting the battery unit 20. The configuration of the battery bracket 40 is not limited to the above but may be changed as needed.

Thus, the detailed description has been made on one embodiment of the invention. It is to be noted however that the invention is not limited to such an embodiment but may be practiced in an appropriate combination of the one embodiment and any of exemplary modifications thereof. Needless to say, the invention can be practiced in various modes without departing from the scope of the invention.

What is claimed is:

1. A vehicle battery mounting structure comprising:
a pair of first frame members, each of the first frame members supporting a vehicle floor and including a front portion, an inclined portion and a rear portion, the front portion extending in a front-rear direction of a vehicle, the inclined portion extending rearward from a rear end of the front portion in the front-rear direction of the vehicle and upward from the rear end of the front portion in a vertical direction of the vehicle, the rear portion extending rearward from a rear end of the inclined portion in the front-rear direction of the vehicle;
a cross member that extends a width direction of the vehicle;
a battery unit disposed under the vehicle floor in the vertical direction of the vehicle;
a battery bracket that couples the cross member to the battery unit, the cross member being connected to the inclined portion, the battery bracket being disposed at a rear portion of the battery unit and including a vehicle body side fixing portion that a through-hole is formed in;
a connecting member that penetrates the through-hole and interconnects the battery bracket and the cross member in the vertical direction of the vehicle; and
a brittle portion that is formed at a front edge portion constituting a front portion of the through-hole in the front-rear direction of the vehicle and releases the cross member from a connection with the battery unit when a forward load in the front-rear direction of the vehicle is applied to the battery bracket.

2. The vehicle battery mounting structure according to claim 1, wherein
the brittle portion releases the cross member from the connection with the battery unit when a forward load of more than a predetermined value is applied to the brittle portion in the front-rear direction of the vehicle.

3. The vehicle battery mounting structure according to claim 1, wherein:
the rear portion of the battery unit in the front-rear direction of the vehicle is disposed under the inclined portion in the vertical direction of the vehicle, as seen in the width direction of the vehicle.

4. The vehicle battery mounting structure according to claim 1, wherein:
the battery bracket includes a battery-side fixing portion connected to the battery unit; and
the battery-side fixing portion is provided with a reinforcing portion that increases connection strength between the battery-side fixing portion and the battery unit to a higher level than that of connection strength between the vehicle body side fixing portion and the cross member.

5. The vehicle battery mounting structure according to claim 4, wherein:
the battery bracket includes a side wall that extends from the battery-side fixing portion toward the vehicle body side fixing portion;
the vehicle body side fixing portion is disposed upwardly of the battery-side fixing portion in the vertical direction of the vehicle; and
the reinforcing portion extends between the battery-side fixing portion and the side wall.

6. The vehicle battery mounting structure according to claim 1, wherein:
the battery unit includes a battery module for storing electric power and a battery rear frame extending in the width direction of the vehicle;
as seen in the vertical direction of the vehicle, a position of the battery rear frame is rearward of a position of the battery module in the front-rear direction of the vehicle; and
the battery bracket is provided at the battery rear frame.

7. The vehicle battery mounting structure according to claim 1, wherein:
the pair of the first frame members is a pair of rear side members extending along both end portions of the vehicle floor with respect to the width direction of the vehicle;
the cross member interconnects the inclined portions of the pair of the rear side members; and
the battery bracket interconnects the battery unit and the cross member.

8. The vehicle battery mounting structure according to claim 1, wherein the brittle portion is a portion formed by partially cutting away the battery bracket.

9. The vehicle battery mounting structure according to claim 1, wherein
the brittle portion is a groove extending in the front-rear direction of the vehicle.

10. The vehicle battery mounting structure according to claim 1, wherein:
the battery bracket attaches to a rear end mounting portion of a battery rear frame of the battery unit and the cross member.

11. The vehicle battery mounting structure according to claim 10, wherein:
the rear end mounting portion includes a forward mounting portion and a rearward mounting portion, the forward mounting portion is an upper wall of the battery rear frame, and the rearward mounting portion extends rearward from the forward mounting portion in the front-rear direction of the vehicle.

* * * * *